(12) United States Patent
Kuwabara et al.

(10) Patent No.: US 8,778,489 B2
(45) Date of Patent: Jul. 15, 2014

(54) OPTICAL LAYERED PRODUCT

(75) Inventors: Masaomi Kuwabara, Shizuoka (JP); Chikara Murata, Shizuoka (JP); Kazuya Ohishi, Shizuoka (JP); Hideki Moriuchi, Shizuoka (JP)

(73) Assignee: Tomoegawa Co., Ltd., Tokyo (JP)

(*) Notice: Subject to any disclaimer, the term of this patent is extended or adjusted under 35 U.S.C. 154(b) by 994 days.

(21) Appl. No.: 12/079,968

(22) Filed: Mar. 31, 2008

(65) Prior Publication Data

US 2008/0241508 A1 Oct. 2, 2008

(30) Foreign Application Priority Data

Mar. 31, 2007 (JP) ................. 2007-095848
Mar. 31, 2007 (JP) ................. 2007-095849
Apr. 24, 2007 (JP) ................. 2007-114196

(51) Int. Cl.
 *B32B 5/16* (2006.01)
(52) U.S. Cl.
 USPC ....................................... 428/323
(58) Field of Classification Search
 USPC ....................................... 428/323
 See application file for complete search history.

(56) References Cited

U.S. PATENT DOCUMENTS

| 6,343,865 | B1 | 2/2002 | Suzuki |
| 7,727,626 | B2 * | 6/2010 | Inokuma et al. ............. 428/323 |
| 2005/0255291 | A1 | 11/2005 | Iwata et al. |
| 2006/0074172 | A1 * | 4/2006 | Yang et al. ............. 524/492 |
| 2007/0047087 | A1 * | 3/2007 | Fukuda et al. ............. 359/582 |
| 2007/0053055 | A1 | 3/2007 | Mikami et al. |
| 2007/0195431 | A1 | 8/2007 | Asakura et al. |
| 2009/0002831 | A1 | 1/2009 | Mikami et al. |

FOREIGN PATENT DOCUMENTS

| JP | 11-305010 | 11/1999 |
| JP | 2002-196117 | 7/2002 |
| JP | 2002-267818 | 9/2002 |
| JP | 2004-025787 | 1/2004 |
| JP | 2004-026974 | 1/2004 |
| JP | 2005-239837 | 9/2005 |
| JP | 2005-316413 | 11/2005 |
| JP | 2006-052128 | 2/2006 |
| JP | 2006-113561 | 4/2006 |
| JP | 2006-184493 | 7/2006 |
| JP | 2006-301607 | 11/2006 |
| JP | 2007-065207 | 3/2007 |
| JP | 2007-072100 | 3/2007 |
| JP | 2007-121993 | 5/2007 |
| JP | 2007-133236 | 5/2007 |
| JP | 2007-249191 | 9/2007 |
| JP | 2007-272131 | 10/2007 |
| JP | 2007-272132 | 10/2007 |
| WO | WO-2005/033752 | 4/2005 |
| WO | WO-2006/106757 | 10/2006 |
| WO | WO 2006132048 A1 * | 12/2006 |

OTHER PUBLICATIONS

CRC Handbook of Chemistry and Physics, CRC Press, 1978, p. F-86.*
Dipentaerythritol hexa acrylate technical information, dowloaded from http://chemical.kowa.com/download/A-DPH%20kowa.pdf on Apr. 26, 2011.*

* cited by examiner

*Primary Examiner* — Callie Shosho
*Assistant Examiner* — Elizabeth Robinson
(74) *Attorney, Agent, or Firm* — Jordan and Hamburg LLP

(57) ABSTRACT

An optical layered product has a translucent substrate having at least an optically functional layer, containing translucent microparticles, provided directly or via another layer onto one or both sides of the substrate. The standard deviation of area dispersion variability of the translucent microparticles in the optically functional layer is in the range of 0.04 to 0.20.

8 Claims, 2 Drawing Sheets

[Fig. 1]
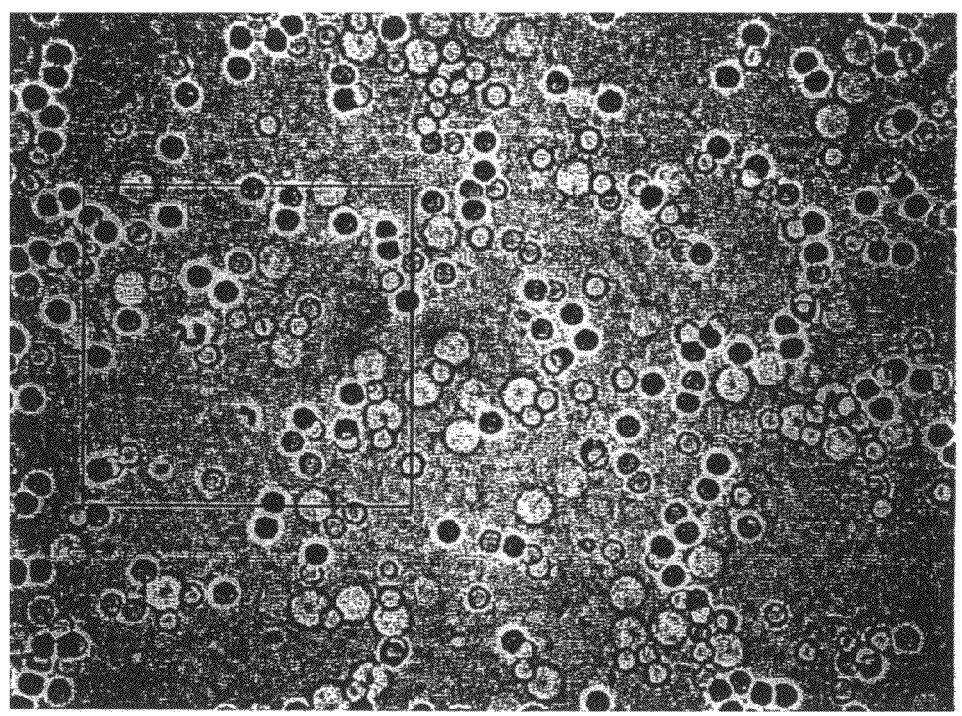

[Fig. 2]
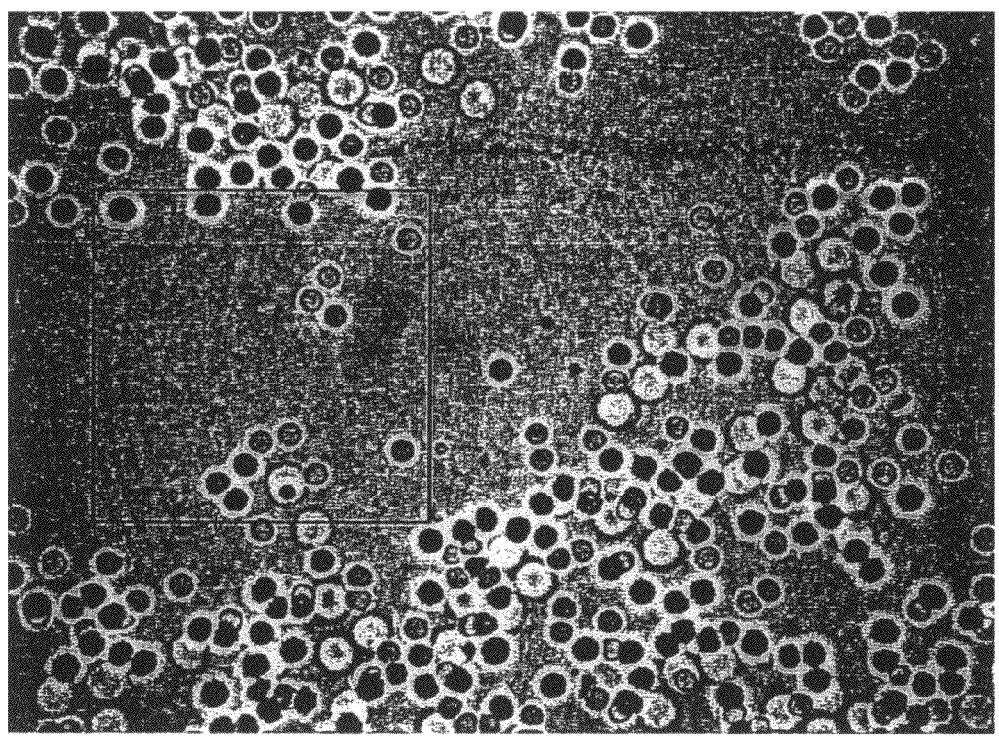

OPTICAL LAYERED PRODUCT

BACKGROUND OF THE INVENTION

1. Field of the Invention

The present invention relates to optical layered products to be provided on display surfaces of liquid crystal displays (LCDs), plasma displays (PDPs) and the like and, in particular, to optical layered products for improving visibility of screens.

2. Description of the Prior Art

Recently, displays such as LCDs and PDPs have been improved to be produced and sold in various sizes for a number of applications ranging from mobile phones to large-size television sets.

Such displays may have impaired visibility due to background reflections into the display surfaces of room lightings such as fluorescent lights, sunlight incident through windows and shadows of an operator. As such, in order to improve visibility, the display surfaces are provided with functional films on the outermost surface, such as antiglare films having microirregularities, which are capable of diffusing surface-reflected lights, suppressing specular reflections of external lights and preventing background reflections of outside environments (having antiglare properties) (conventional AG).

These functional films are generally produced and sold as products comprising a translucent substrate such as polyethylene terephthalate (hereinafter referred to as "PET") and triacetyl cellulose (hereinafter referred to as "TAC") over which an antiglare layer having microirregularities is provided or as products comprising a light-diffusing layer on which a low-refractive index layer is layered, with development now being carried out for functional films providing desired functions through combinations of layer configurations.

With a recent progress of an increase in size, definition and contrast of displays, however, there is now a need for enhancement of performance required for such functional films.

When an antiglare film is used for the outermost surface, images in black tend to be whiter due to diffusion of light with a disadvantageous decrease in contrast for use in a bright room. An antiglare film is therefore needed which attains a high contrast even at the sacrifice of antiglare properties (high-contrast AG).

In order to attain a high contrast, a method has been adopted in which one or more low-reflection layers are provided onto the top layer of an antiglare film (AG with low-reflection layer).

On the other hand, when an antiglare film is used on the outermost surface, a problem arises in which dazzling (portions with high and low intensities in brightness) appears on the surface supposedly due to the microirregularities, decreasing visibility. Such dazzling is likely to occur in association with an increased definition in association with an increase in number of picture elements for a display and with improvement of display techniques such as picture element division scheme. An antiglare film having an antidazzle effect is therefore desired (high-definition AG).

In order to attain antidazzle effects, development is ongoing for a method as in Patent Reference 1, in which Sm (average peak spacing), Ra (center line average roughness) and Rz (average ten-point height of irregularities) of the surface of functional films are specifically defined and for a method for regulating background reflection of external lights into a display screen, dazzling phenomenon and white balance as in Patent References 2 and 3, in which areas of surface haze and internal haze are precisely defined. As such, in designing a light-diffusing sheet to be used for high-definition LCDs, internal diffusion properties for providing antidazzle effects and surface diffusion properties for providing antiwhitening effects are controlled.

Patent Reference 1: Japanese Unexamined Patent Publication No. 2002-196117

Patent Reference 2: Japanese Unexamined Patent Publication No. 1999-305010

Patent Reference 3: Japanese Unexamined Patent Publication No. 2002-267818

Thus, there are problems to be solved such as antiglare functions, contrast enhancement and antidazzling and there is a tradeoff in which one of the properties can be sought only at the sacrifice of the others. Nothing so far has satisfied these functions with a configuration where a single layer is layered on a translucent substrate. As such, as a method for providing these functions simultaneously, development is under way with respect to the shape of membranes and films to be coated in a multi-layer manner. Such multi-layer lamination however requires a process for coating a translucent substrate with multiple layers, incurring more cost. Also, it is difficult to adjust the balance between the multiple layers, only allowing in fact to select and implement part of these functions according to the intended use.

SUMMARY OF THE INVENTION

It is therefore a primary object of the present invention to provide an optical layered product applicable to high-definition LCDs which has functions of antiglaring, contrast enhancement and antidazzling in a balanced manner and, in particular, to provide an optical layered product in which these functions are achieved in a configuration where a single layer is layered on a translucent substrate.

Also, durability, especially abrasion resistance, is required when such an optical layered product is used as a functional film to be used for the outermost surface of a large-size display, especially large-size LCD, that is remarkably prevailing recently as a household appliance.

In addition to the primary object described above, it is therefore a secondary object of the present invention to provide an optical layered product which is excellent in durability.

As a result of keen studying for solutions for both obtaining high antiglare properties and suppressing dazzling in order to solve the primary object (in particular, high antiglare properties and antidazzle functions), the present inventor has found that the degree of dispersion of translucent microparticles across an optically functional layer of an optical layered product is important, to successfully accomplish first inventions (1) to (4) below.

The first invention (1) is an optical layered product in which at least an optically functional layer containing translucent microparticles is provided directly or via another layer onto one or both sides of a translucent substrate, wherein the standard deviation of area dispersion variability of the translucent microparticles in the optically functional layer is in the range of 0.04 to 0.20.

The first invention (2) is the optical layered product according to the invention (1) wherein 95% or more, in number, of the translucent microparticles are translucent spherical resin microparticles which have an actual particle size in the range of 1 to 20 μm as observed by electron microscopy.

The first invention (3) is the optical layered product according to the invention (1) or (2) wherein the optically functional layer contains at least a radiation-curable resin, one or more kinds of low-refractive index translucent microparticles and one or more kinds of high-refractive index translucent microparticles.

The first invention (4) is the optical layered product according to the invention (3) wherein the difference in refractive index between the radiation-curable resin and the low-refractive index translucent microparticles is in the range of ±0.05 or less and the difference in refractive index between the radiation-curable resin and the high-refractive index translucent microparticles is in the range of 0.05 or more.

As a result of keen studying in order to solve the primary object, the present inventor has found that the internal light scattering and the surface light scattering of the optically functional layer are optimized by the low-refractive index translucent microparticles being more abundantly distributed toward the surface side, to successfully accomplish second inventions (5) to (8) below.

The second invention (5) is an optical layered product in which at least an optically functional layer containing translucent microparticles with different refractive indices is provided directly or via another layer onto one or both sides of a translucent substrate, wherein the translucent microparticles with lower refractive indices are more abundantly contained in the optically functional layer closer to the surface side than to the translucent substrate side.

The second invention (6) is the optical layered product according to the invention (5) wherein 95% or more, in number, of the translucent microparticles are translucent spherical resin microparticles which have an actual particle size in the range of 1 to 20 μm as observed by electron microscopy.

The second invention (7) is the optical layered product according to the invention (5) or (6) wherein the optically functional layer contains at least a radiation-curable resin, one or more kinds of low-refractive index translucent microparticles and one or more kinds of high-refractive index translucent microparticles.

The second invention (8) is the optical layered product according to the invention (7) wherein the difference in refractive index between the radiation-curable resin and the low-refractive index translucent microparticles is in the range of ±0.05 or less and the difference in refractive index between the radiation-curable resin and the high-refractive index translucent microparticles is in the range of 0.05 or more.

As a result of keen studying in order to solve the primary and secondary objects, the present inventor has found that the objects can be solved by defining the film thickness of the optically functional layer and the particle size of the translucent microparticles of the optical layered product to be within predetermined ranges, to successfully accomplish third inventions (9) to (12).

In other words, the third invention (9) is an optical layered product in which at least an optically functional layer containing translucent microparticles is provided directly or via another layer onto one or both sides of a translucent substrate, wherein the particle size of 95% or more, in number, of the translucent microparticles and the film thickness of the optically functional layer satisfy the formula:

$$3.6 \ln(X) - 0.70 \geq Y \geq 3.6 \ln(X) - 4.7$$

wherein
$4.5 \leq X \leq 15$, $1 \leq Y \leq 9$,

X is the film thickness, in μm, of the optically functional layer, and

Y is the actual particle size, in μm, of the translucent microparticles as observed by electron microscopy.

The third invention (10) is the optical layered product according to the invention (9) wherein the optically functional layer contains at least a radiation-curable resin, one or more kinds of low-refractive index translucent microparticles and one or more kinds of high-refractive index translucent microparticles.

The third invention (11) is the optical layered product according to the invention (10) wherein the difference in refractive index between the radiation-curable resin and the low-refractive index translucent microparticles is in the range of ±0.05 or less and the difference in refractive index between the radiation-curable resin and the high-refractive index translucent microparticles is in the range of 0.05 or more.

The third invention (12) is the optical layered product according to the inventions (9) to (11) wherein the translucent microparticles are a filler based on polymethyl methacrylate or styrenes.

According to the first inventions, such an effect is provided that an optical layered product guaranteeing high antiglare properties and having highly suppressed dazzling may be obtained even when the optically functional layer has a single-layer construction.

According to the second inventions, such an effect is provided that images having enhanced contrast and suppressed dazzling may be obtained when the optical layered product is mounted on a display such as an LCD.

According to the third inventions, such an effect is provided that an optical layered product guaranteeing high antiglare properties, having highly suppressed dazzling and being excellent in durability (abrasion resistance) may be obtained even when the optically functional layer has a single-layer construction.

BRIEF DESCRIPTION OF THE DRAWINGS

FIG. 1 shows the manner of dispersion of translucent microparticles in an optically functional film produced in Example 1; and FIG. 2 shows the manner of dispersion of translucent microparticles in an optically functional film produced in Comparative Example 1.

DETAILED DESCRIPTION OF THE PREFERRED EMBODIMENTS

The best mode for carrying out the invention will be described below. Unless otherwise specified, matters described are common to all the first, second and third inventions.

First, each component of the optical layered product according to the best mode will be described in detail. The optical layered product according to the best mode indispensably comprises at least an optically functional layer, containing translucent microparticles, provided onto one or both sides of a translucent substrate. The term "translucent" for the microparticles and/or the substrate means "permitting the passage of light" including both "transparent" and "semi-transparent" (transmitting and diffusing light so that objects beyond cannot be seen clearly), and "transparent" is preferable. Furthermore, the optical layered product according to the best mode may include a low reflection layer, antifouling layer, antistatic layer, infrared reflection (NIR) layer (infrared cutoff layer) and/or polarizing layer over the optical layered product and/or between the translucent substrate and the optical layered product. The translucent substrate and the optically functional layer as indispensable layers will now be described and optional layers will subsequently be described.

To begin with, the translucent substrates (transparent substrate) according to the best mode are not particularly limited as long as they are translucent. Glasses such as quartz glass and soda glass may be used. However, various resin films of PET, TAC, polyethylene naphthalate (PEN), polymethyl methacrylate (PMMA), polycarbonate (PC), polyimide (PI), polyethylene (PE), polypropylene (PP), polyvinyl alcohol (PVA), polyvinyl chloride (PVC), cycloolefin copolymers (COC), norbornene-containing resins, polyether sulfone, cellophane, aromatic polyamides and the like may preferably be used. For use in PDPs and LCDs, films of PET and TAC are more preferable. Polarizing substrates may also be used as translucent substrates. Polarizing substrates are obtained from materials capable of forming transparent films, specific examples of which include polyvinyl alcohol and polyvinylene. Films obtained by orientating the materials described above may be used as such polarizing substrates. For example, films of polyvinyl alcohol (PVA) obtained by uniaxially orientating polyvinyl alcohol to which iodine or a dyestuff is adsorbed as a dichroic element are preferably used.

The translucency (transparency) of these substrates are preferably as high as possible. The total light transmittance (JIS K7105) of such substrates is preferably 80% or higher and more preferably 90% or higher. The thickness of the translucent substrates is preferably small in view of weight saving. In consideration of productivity and ease of handling, however, those having a thickness preferably in the range of 1 to 700 μm and more preferably in the range of 25 to 250 μm are preferably used.

Also, the adherence between the translucent substrate and the resin layer can be enhanced by subjecting the translucent substrate to surface treatment such as alkaline treatment, corona treatment, plasma treatment and sputtering and/or surface modification treatment such as application of surface active agents, silane coupling agents or the like or Si vapor deposition.

Next, the optically functional layer according to the best mode will be described. The optically functional layer according to the best mode is composed of a resin matrix in which translucent microparticles are dispersed. Here, a "resin matrix" is a totally solid component in a coating material, excluding translucent microparticles. The resin matrix is preferably one that is formed by radiation-curing a radiation-curable resin composition, but is not particularly limited. Examples of radiation-curable resin compositions composing the resin matrix include monomers, oligomers and pre-polymers having radically polymerizable groups such as acryloyl, methacryloyl, acryloyloxy and methacryloyloxy groups or cationically polymerizable groups such as epoxy, vinyl ether and oxetane groups. Those mentioned can be used alone or in combination as appropriate. Examples of monomers include methyl acrylate, methyl methacrylate, methoxy polyethylene methacrylate, cyclohexyl methacrylate, phenoxyethyl methacrylate, ethylene glycol dimethacrylate, dipentaerythritol hexaacrylate, trimethylolpropane trimethacrylate and pentaerythritol triacrylate. Examples of oligomers and prepolymers include acrylate compounds such as polyester acrylates, polyurethane acrylates, multifunctional urethane acrylates, epoxy acrylates, polyether acrylates, alkyd acrylates, melamine acrylates and silicone acrylates, unsaturated polyesters, epoxy-based compounds such as tetramethylene glycol diglycidyl ether, propylene glycol diglycidyl ether, neopentyl glycol diglycidyl ether, bisphenol-A diglycidyl ether and various cycloaliphatic epoxies as well as oxetane compounds such as 3-ethyl-3-hydroxymethyl oxetane, 1,4-bis-{[(3-ethyl-3-oxetanyl)methoxy]methyl}benzene and di[1-ethyl-(3-oxetanyl)]methyl ether. Those mentioned can be used alone in combination.

The radiation-curable resin compositions described above can be cured on their own by irradiation with electron beams. When they are cured by irradiation with ultraviolet radiations, however, addition of a photopolymerization initiator will be needed. Radiations to be used include ultraviolet radiations, visible lights, infrared radiations and electron beams. Also, these radiations may be polarized or non-polarized. Examples of photopolymerization initiators include radical polymerization initiators, such as acetophenones, benzophenones, thioxanthones, benzoin and benzoin methyl ether as well as cationic polymerization initiators, such as aromatic diazonium salts, aromatic sulfonium salts, aromatic iodonium salts and metallocene compounds. Those mentioned can be used alone in combination.

According to the best mode, in addition to the radiation-curable resin compositions described above, polymeric resins may be added to such an extent that the polymerization curing may not be prevented. Such polymeric resins are thermoplastic resins soluble in organic solvents to be used for coating materials for resin layer to be subsequently referred to, examples of which include acrylic resins, alkyd resins, polyester resins and cellulose or cellulose derivatives. Such resins preferably contain acidic functional groups such as carboxyl, phosphoric and sulfonic groups.

Also, additives such as leveling agents, thickening agents and antistatic agents may be used. Leveling agents work to equalize the surface tension of coatings to repair any defects before formation of coatings. Substances lower in both interfacial tension and surface tension than the radiation-curable resin compositions described above are used as leveling agents. Thickening agents work to impart thixotropic properties to the radiation-curable resin compositions described above and are effective in formation of microirregularities on the surface of resin layers due to the prevention of translucent microparticles, pigments and the like from precipitation.

The resin matrix in the optically functional layer is mainly composed of a cured product of any of the radiation-curable resin compositions described above. The process for forming it comprises applying a coating material comprising a radiation-curable resin composition and an organic solvent and evaporating the organic solvent, before irradiating an electron beam or ultraviolet radiation to effect curing. Organic solvents to be used here must be selected among those preferable for dissolving the radiation-curable resin compositions. Specifically, organic solvents selected from alcohols, esters, ketones, ethers and aromatic hydrocarbons may be used alone or in combination, in consideration of coatabilities such as wettability in relation to translucent substrates, viscosity and drying rate. Among them, particularly preferred solvents for attaining the predetermined area dispersion variability according to the first inventions will subsequently be referred to.

As translucent microparticles to be contained in the optically functional layer, one or more kinds of low-refractive index translucent microparticles or high-refractive index microparticles may be used. For example, organic translucent microparticles composed of acrylic resins, polystyrene resins, styrene-acrylics copolymers, polyethylene resins, epoxy resins, silicone resins, polyvinylidene fluoride, polyethylene fluoride and the like may be used.

Here, one or more kinds of low-refractive index translucent microparticles may preferably be used in combination with one or more kinds of high-refractive index translucent microparticles as microparticles to be contained in the optically functional layer. The translucent microparticles to be contained in the optically functional layer of the second inventions include, however, at least low-refractive index translucent microparticles and high-refractive index translucent microparticles. The high-refractive index translucent microparticles act on light scattering (internal light scattering) within the optically functional layer to prevent dazzling of images. The low-refractive index translucent resins act on light scattering (external light scattering) on the surface of the optically functional layer to prevent background reflection of external lights. The low-refractive index translucent microparticles have a difference in refractive index in relation to the radiation-curable resin matrix layer of preferably 0.05 or less, more preferably 0.03 or less and particularly preferably 0.01 or less. If the difference in refractive index between the radiation-curable resin matrix layer and the low-refractive index translucent microparticles is greater than 0.05, the degree of light scattering will be so great that contribution to contrast enhancement may be reduced. The refractive index of the low-refractive index translucent microparticles is preferably from 1.45 to 1.55 and more preferably from 1.49 to 1.55. The high-refractive index translucent microparticles have a difference in refractive index in relation to the radiation-curable resin matrix layer of preferably 0.05 or more and more preferably 0.07 or more. No particular upper limit is defined, but it is for example 0.15 or less. If the difference in refractive index between the radiation-curable resin and the high-refractive index translucent microparticles is smaller than 0.05, the degree of internal scattering will be so small that contribution to antidazzle effects may be reduced. The refractive index of the high-refractive index translucent microparticles is preferably from 1.55 to 1.65 and more preferably from 1.58 to 1.63.

The translucent microparticles are preferably spherical, with a degree of circularity being preferably 50% or higher and more preferably 80% or higher. Use of spherical translucent microparticles makes protrusions from the surface of the antiglare layer gentler, stains of oils and the like less likely to be adhered and any adhered stains easier to be wiped off. When deformed translucent microparticles are used, such problems will occur that internal scattering may be intense due to the translucent microparticles, images may be whitish and contrast may be reduced. According to the present invention, the "degree of circularity" is defined by the equation:

$$\text{Degree of circularity (\%)} = (4\pi C/D^2) \times 100$$

wherein

C represents the projected area of a translucent microparticle, and

D represents the peripheral length of the translucent microparticle.

The degree of circularity can be calculated based on C and D above as obtained for example by obtaining a projected image of a translucent microparticle taken through a transmission electron microscope and analyzing the image using an image analyzer (for example, EXECLII manufactured by Nippon Avionics, Co. Ltd.). As apparent from the equation above, the degree of circularity will approach 100% as the translucent microparticle approaches a true sphere, the value decreasing when it has an indeterminate form. Herein, the average of measurements made on 10 translucent microparticles is defined as the degree of circularity.

Next, for the first and second inventions, 95% or more (more preferably 99% or more), in number, of the translucent microparticles have a particle size of preferably 1 to 20 µm and more preferably 3 to 10 µm. When the particle size is smaller than 1 µm, light scattering effects may not sufficiently be obtained so that dazzling may not be suppressed. When the particle size is greater than 20 µm, the optically functional layer must be increased in thickness, adding to the material cost. Also for the second inventions, the particle size of the translucent microparticles is from 20 to 80% and preferably from 30 to 70% in relation to the film thickness. Here, the particle size refers to an actual value (experimental value) from an image as observed through an electron microscope. Among the total number, fine powder included during the process for producing the microparticles represents less than 5% (more preferably, less than 1%). Herein, the "fine powder" means organic and inorganic foreign objects such as dust, foreign objects produced from components of the microparticles, and the like. In the first and second inventions, the percentage of the translucent microparticles in the resin matrix described above is not particularly limited and is preferably from 5 to 10% by weight of the solid content in the coating material for the optically functional layer. Within such a range, it is preferable in satisfying properties such as antiglare functions and dazzling and it is easy to control microirregularities on the surface of the resin layer and light scattering. For the first inventions, within such a range, the area dispersion balance may be within a predetermined range such that properties such as antiglare properties may be balanced. When 95% or more (or 99% or more) of the total translucent microparticles have a particle size of 1 to 20 µm (or 3 to 10 µm), the area dispersion variability with respect only to the translucent microparticles within such ranges is desirably within the respective preferred ranges mentioned below.

In the optically functional layer according to the first inventions, the translucent microparticles are neither uniformly dispersed nor coagulated in the optically functional layer, but are in a condition somewhere between the uniform dispersion and the coagulation. FIG. 1 is an electron photomicrograph of such a condition. Here, a "standard deviation of area dispersion variability" refers to a value obtained by randomly extracting 100 sections each 50 µm in square, counting the number of particles contained in each section and dividing the value of the standard deviation of the number of particles in each lattice by the average number of particles in the 100 sections. The standard deviation of area dispersion variability according to the present invention is preferably from 0.04 to 0.20, more preferably from 0.06 to 0.15 and even more preferably from 0.08 to 0.13.

The optically functional layers according to the first and second inventions have a thickness in the range of preferably 3 to 25 µm, more preferably 5 to 15 µm and even more preferably 7 to 12 µm. For the first inventions, when the thickness of the optically functional layer is less than 3 µm, a failure in curing may occur due to oxygen inhibition during ultraviolet radiation curing to deteriorate wear resistance of the resin layer. For the second inventions, when the thickness of the optically functional layer is less than 3 µm, microparticles with different specific gravities may not sufficiently be separated in the thickness direction. For the first and second inventions, when the thickness is more than 25 µm, cure shrinkage of the resin layer may cause curls, microcracks, a decrease in adhesion in relation to the translucent substrate or a decrease in translucency. It may also cause a cost increase due to an increase in coating material needed in association with the increase in film thickness.

Density distribution of the low-refractive index translucent microparticles according to the second inventions is defined as the value obtained by randomly extracting 20 sections from an electron photomicrograph of a cross section of the optically functional layer in such a manner that the width direction of the optically functional layer may be 30 µm, obtaining the total number of the center points of low-refractive index translucent microparticles contained in the sections and the number of the center points of low-refractive index translucent microparticles located closer to the surface side than to the centerline along the thickness direction of the whole optically functional layer, and substituting them into the equation below. The value is preferably 60% or more and more preferably 70% or more.

Density distribution (%)=(number of center points of low-refractive index translucent microparticles located closer to surface side than to centerline of optically functional layer/total number of center points of low-refractive index translucent microparticles in optically functional layer)×100

Next, 95% or more (more preferably 99% or more), in number, of the translucent microparticles according to the third inventions have a particle size of preferably 1 to 9 μm and more preferably 3 to 7 μm. When the particle size is smaller than 1 μm, light scattering effects may not sufficiently be obtained so that dazzling may not be suppressed. Also, when the particle size is greater than 9 μm, the optically functional layer must be increased in thickness, adding to the material cost. Here, the particle size refers to an actual value from an image as observed through an electron microscope. Among the total number, fine powder included during the process for producing the microparticles represents less than 5% (more preferably, less than 1%). The percentage of the translucent microparticles in the resin matrix described above is not particularly limited and is preferably from 5 to 10% by weight of the solid content in the coating material for the optically functional layer. Within such a range, it is preferable in satisfying properties such as antiglare functions and dazzling and it is easy to control microirregularities on the surface of the resin layer and light scattering.

The optically functional layers according to the third inventions have a thickness in the range of 4.5 to 15 μm, more preferably 6 to 12 μm and even more preferably 7 to 10 μm. When the thickness of the optically functional layer is less than 4.5 μm, a failure in curing may occur due to oxygen inhibition during ultraviolet radiation curing to deteriorate wear resistance of the resin layer. When the thickness is more than 15 μm, cure shrinkage of the resin layer may cause curls, microcracks, a decrease in adhesion in relation to the translucent substrate or a decrease in translucency. It may also cause a cost increase due to an increase in coating material needed in association with the increase in film thickness.

Relationship between the film thickness of the optically functional layer and the particle size of the translucent microparticles according to the third inventions will then be described in detail. The film thickness of the optically functional layer and the particle size of the translucent microparticles preferably satisfy the formula below. Such relationship is established with respect to 95% or more, in number, of the translucent microparticles.

$$3.6 \ln(X)-0.70 \geq Y \geq 3.6 \ln(X)-4.7$$

wherein $4.5 \leq X \leq 15$, $1 \leq Y \leq 9$,

X is the film thickness, in μm, of the optically functional layer, and

Y is the actual particle size, in μm, of the translucent microparticles as observed by electron microscopy.

Where $3.6 \ln(X)-0.70 \leq Y$, contrast would be degraded in a light room because light scattering on the surface of the optically functional layer could not be controlled to a lower degree. Where $Y \leq 3.6 \ln(X)-4.7$, antiglare properties would be degraded because light scattering on the surface of the optically functional layer could not be controlled to a higher degree. Here, when 95% or more (or 99% or more) of the total translucent microparticles have a particle size of 1 to 9 μm (or 3 to 7 μm), the relationship according to the formula described above is preferably established with respect to 95% or more, in number, of the translucent microparticles within such ranges.

According to the best mode, a low-reflection layer may be provided over the optically functional layer in order to enhance contrast. In such a case, the refractive index of the low-reflection layer must be lower than that of the optically functional layer and is preferably 1.45 or less. Materials having such a characteristic include inorganic low-reflection materials composed of micronized inorganic materials such as LiF (refractive index n=1.4), $MgF_2$ (n=1.4), $3NaF.AlF_3$ (n=1.4), $AlF_3$ (n=1.4) and $Na_3AlF_6$ (n=1.33) that are included in an acrylic resin, epoxy resin and the like as well as organic low-reflection materials such as fluorine-based or silicone-based organic compounds, thermoplastic resins, thermosetting resins and radiation-curable resins. Among them, fluorine-containing materials are preferred for prevention of stains. Also, the low-reflection layer preferably has a critical surface tension of 20 dyne/cm or lower. When the critical surface tension was higher than 20 dyne/cm, stains adhered to the low-reflection layer would be difficult to remove.

Examples of the fluorine-containing materials described above include vinylidene fluoride-based copolymers, fluoroolefin/hydrocarbon copolymers, fluorine-containing epoxy resins, fluorine-containing epoxy acrylates, fluorine-containing silicones and fluorine-containing alkoxysilanes, which are soluble in organic solvents and easy to handle. These materials can be used alone or in combination.

Also, fluorine-containing methacrylates, such as 2-(perfluorodecyl)ethyl methacrylate, 2-(perfluoro-7-methyloctyl) ethyl methacrylate, 3-(perfluoro-7-methyloctyl)-2-hydroxypropyl methacrylate, 2-(perfluoro-9-methyldecyl)ethyl methacrylate and 3-(perfluoro-8-methyldecyl)-2-hydroxypropyl methacrylate, fluorine-containing acrylates, such as 3-perfluorooctyl-2-hydroxypropyl acrylate, 2-(perfluorodecyl)ethyl acrylate and 2-(perfluoro-9-methydecyl)ethyl acrylate, epoxides, such as 3-perfluorodecyl-1,2-epoxypropane and 3-(perfluoro-9-methyldecyl)-1,2-epoxypropane as well as radiation-curable, fluorine-containing monomers, oligomers and prepolymers such as epoxy acrylates may be mentioned. These materials can be used alone or in combination.

Furthermore, a low-reflection material obtained from a sol made of ultrafine silica particles with a size of 5 to 30 nm that are dispersed in water or an organic solvent in mixture with a fluorine-based film former may be used. Used as the sol made of ultrafine silica particles with a size of 5 to 30 nm that are dispersed in water or an organic solvent are known silica sols obtained by condensing an activated silicate, through a process for dealkalizing alkaline metal ions in an alkali silicate through ion exchange or a process for neutralizing an alkali silicate with a mineral acid, known silica sols obtained by hydrolyzing and condensing an alkoxysilane in an organic solvent under the presence of a basic catalyst and known organic solvent-based silica sols (organosilica sols) obtained by substituting water in the aqueous silica sols described above with an organic solvent by distillation and the like. These silica sols can be used both in aqueous and organic solvent systems. For producing organic solvent-based silica sols, it is unnecessary to completely substitute water with an organic solvent. The silica sols described above contain 0.5 to 50% by weight of solid content as $SiO_2$. Ultrafine silica particles in the silica sols may be spherical, needle-shaped, plate-shaped and the like.

As film formers, alkoxysilanes, metal alkoxides, hydrolysates of metal salts, fluorine-modified polysiloxanes and the like may be used. Among the film formers described above, fluorine-containing compounds may preferably be used in particular because they can suppress adhesion of oils due to a decrease in critical surface tension of the low-reflection layer. The low-reflection layer according to the present invention may be obtained by diluting the material described above with a diluent for example and applying it over a radiation-curable resin layer by means of a spin coater, roll coater, printing and the like, followed by drying and setting it by heat or radiation (when an ultraviolet radiation is used, the photopolymerization initiator described above is used) and the like. Although radiation-curable, fluorine-containing monomers, oligomers and prepolymers are excellent in antifouling properties, they are poor in wettability and thus cause problems that the low-reflection layer is repelled on the radiation-curable resin layer depending on composition and that the low-reflection layer is peeled off from the radiation-curable resin layer. Therefore, it is desirable to appropriately mix and use the monomers, oligomers and prepolymers having polymerizable unsaturated bonds, such as acryloyl series, methacryloyl series, acryloyloxy group and methacryloyl group, described as the radiation-curable resins mentioned above to be used for the radiation-curable resin layers.

When plastics-based films that are likely to be damaged by heat, such as PET and TAC, are used for translucent substrates, radiation-curable resins are preferably selected for the materials of these low-reflection layers.

Thicknesses for low-reflection layers to provide good antireflection functions can be calculated according to a known equation. When incident light enters a low-reflection layer orthogonally, the following relationship must only be satisfied as conditions for the low-reflection layer not to reflect the light but to allow the light to transmit at 100%. In the equation, $N_o$ represents the refractive index of the low-reflection layer, $N_s$ represents the refractive index of the radiation-curable resin layer, h represents the thickness of the low-reflection layer and $\lambda_o$ represents the wavelength of the light.

$$N_o = N_s^{1/2} \quad (1)$$

$$N_o h = \lambda_o/4 \quad (2)$$

It is appreciated that, according to the equation (1) above, in order to prevent the reflection of light at 100%, a material must only be selected such that the refractive index of the low-reflection layer may be the square root of the refractive index of the underlying layer (the radiation-curable resin layer). It is however difficult to find a material which fully satisfies this equation and therefore a material which is as close as possible to such a material is to be selected. According to the equation (2) above, the optimum thickness as a antireflection film for the low-reflection layer is calculated based on the refractive index of the low-reflection layer selected according to the equation (1) and on the wavelength of the light. For example, assuming the refractive indices of the radiation-curable resin layer and the low-reflection layer are 1.50 and 1.38 respectively and the wavelength of the light is 550 nm (reference of luminous efficacy), by substituting these values into the equation (2) above, the thickness of the low-reflection layer will be calculated as approximately 0.1 μm and preferably in the range of 0.1±0.01 μm.

The optical layered product according to the best mode can be provided with an antifouling layer over the optically functional layer. The antifouling layer contains at least a perfluoroalkyl ether compound which functions as an antifouling component providing substantial antifouling properties. Compounds containing a perfluoroalkyl ether group are used as appropriate. Among them, those having at a terminal thereof one or more functional groups having high affinity with a silica film to be subsequently referred to and/or one or more functional groups capable of chemical bonding are preferable. Perfluoroalkyl compounds to be used can be used alone or in combination. Furthermore, molecular weights of these compounds are preferably from 500 to 10,000 and more preferably from 500 to 4,000. Those with molecular weights of less than 500 can not provide sufficient antifouling properties and durability, while those with molecular weights of more than 10,000 have decreased solubility in solvents to have difficulty in forming uniform antifouling layers.

The optical layered product according to the best mode can be provided with an antistatic layer over and below the optically functional layer (between the optically functional layer and the translucent substrate). The antistatic layer can be provided by such processes as vapor-depositing or sputtering an extremely thin film of a metal, such as aluminum and tin or a metal oxide, such as ITO, solvent-coating dispersions of microparticles or whiskers of aluminum, tin or the like, microparticles or whiskers of metal oxides, such as tin oxide doped with antimony or the like, or of a filler of a charge transfer complex made of 7,7,8,8-tetracyanoquinodimethane and an electron donor such as metal ions or organic cations (donor) in a polyester resin, acrylic resin or epoxy resin or the like, and solvent-coating polypyrroles, polyanilines or the like doped with camphor sulfonic acid or the like. Transmittance of the antistatic layer is preferably 80% or higher for optical applications.

The optical layered product according to the best mode can be provided with a near-infrared radiation cutoff layer over and below the optically functional layer (between the optically functional layer and the translucent substrate). The near-infrared radiation cutoff layer can be formed by inclusion of a near-infrared radiation cutoff dye. A near-infrared radiation cutoff dye is a dye having absorption maximum in relation to a near-infrared radiation having a wavelength of 780 nm or higher. Examples include phthalocyanine dyes, aluminum dyes, anthraquinone dyes, naphthalocyanine dyes, dithiol complex dyes, polymethine dyes, pyrylium dyes, thiopyrylium dyes, squarilium dyes, chloconium dyes, azulenium dyes, tetradehydrocholine dyes, triphenylmethane dyes and diimmonium dyes. These dyes can be used alone or in combination. Specific examples of near-infrared radiation cutoff dyes include EXCOLOR 802K, EXCOLOR 803K and EXCOLOR 814K (trade names of Nippon Shokubai Co., Ltd.), IR-750, IRG-002, IRG-003, IRG-022, IRG-023, IRG-820, CY-2, CY-4, CY-9 and CY-20 (trade names of Nippon Kayaku Co., Ltd.) and PA-001, PA-1005, PA-1006, SIR-114, SIR-128, SIR-130 and SIR-159 (trade names of Mitsui Chemicals, Inc.).

The optical layered product according to the best mode can be rendered a polarizing film. In this case, such a polarizing film has a configuration in which at least an optically functional layer (a layer having an area dispersion variability within a predetermined range, as mentioned above) containing translucent microparticles is provided directly or via another layer on one side of a first protective material and a second protective material is layered via a polarizing layer to the opposite side from the surface layer. Such a polarizing layer can use a light-absorbing polarizing film which transmits certain polarized lights and absorbs other lights and a light-reflecting polarizing film which transmits certain polarized lights and reflects other lights. As light-absorbing polarizing films, films obtained by orientating polyvinyl alcohol, polyvinylene and the like can be used. For example, a polyvinyl alcohol (PVA) film obtained by uniaxially orientating polyvinyl alcohol to which iodine or a dyestuff is adsorbed as a dichroic element may be mentioned. Examples of light-reflecting polarizing elements include DBEF from 3M, composed of several hundreds of alternate layers of two polyester resins (PEN and PEN copolymer) exhibiting different refractive indices along the orientation direction upon orientation which are layered and orientated by an extrusion technique as well as NIPOCS of Nitto Denko Corporation and Transmax of Merck, Ltd. composed of a cholesteric liquid crystal polymer layer layered with a ¼ waveplate, in which incident light from the side of the cholesteric liquid crystal polymer is divided into two circular polarized lights opposed to each other so that one of the lights may be transmitted and the other may be reflected, and the circular polarized light transmitted through the cholesteric liquid crystal polymer layer is converted into a linear polarized light through the ¼ waveplate.

Furthermore, the optical layered product has a definition of transmitted image preferably in the range of 5.0 to 70.0 (a value measured according to JIS K7105, using a 0.5 mm optical comb) and more preferably in the range of 20.0 to 65.0. With a definition of transmitted image below 5.0, contrast will degrade while above 70.0, antiglare properties will degrade, making it unsuitable as an optical layered product to be used for display surfaces.

The optical layered product preferably has an internal haze value (A) and a total haze value (B) which satisfy the formulae (1) to (4) below. Here, a "total haze value" refers to a haze value of an optical layered product and an "internal haze value" refers to a value obtained by subtracting a haze value of a transparent sheet with pressure-sensitive adhesive from a haze value of an optical layered product having the transparent sheet over the microirregular surface of the optical layered product. Both the haze values refer to those measured according to JIS K7105.

$$B > A \tag{1}$$

$$B \leq A + 11 \tag{2}$$

$$B \leq 50 \tag{3}$$

$$A \geq 15 \tag{4}$$

Within the range of B>A+11, the surface becomes whitish, decreasing contrast, because light scattering effects on the surface increase. A preferred range is A+1<B<A+8 and a more preferred range is A+2≤B≤A+6. Within the range of B≤A+11, B>50, transmittance decreases while displayed white images are observably colored, degrading visibility. Within the range of A<15, internal scattering effects are insufficient so that dazzling may appear. A preferred range is 18<A<40 and a more preferred range is 25≤A≤35.

Next, a process for producing the optical layered product according to the best mode will be described in detail.

First, for obtaining the optically functional layer having a desired area dispersion variability according to the first and third inventions, the viscosity of the coating material for the optically functional layer for dispersing the translucent microparticles, drying temperature and the content of the translucent microparticles are important.

First, with respect to the viscosity of the coating material for the optically functional layer, when the viscosity is lowered, the translucent microparticles dispersed in the coating material tend to coagulate, enlarging the area dispersion variability. On the other hand, when the viscosity is increased, it will be difficult to obtain a good surface geometry of an optically functional layer to be formed. Specifically, the viscosity of such a coating material for the optically functional layer is preferably in the range of 5 to 200 Pa·s, more preferably in the range of 10 to 150 Pa·s and even more preferably in the range of 20 to 100 Pa·s. As solvents to be used, MEK (methyl ethyl ketone), MIBK (methyl isobutyl ketone), toluene, IPA (isopropanol), ethyl acetate, methyl acetate and PGME (propylene glycol monomethyl ether) may be mentioned for example.

As to drying temperature, when the drying temperature is lowered, the transparent microparticles dispersed in the coating tend to coagulate, enlarging the area dispersion variability. On the other hand, when the drying temperature is raised, the radical polymerization initiator dispersed in the coating will sublime, making it difficult to obtain sufficient surface strength of a highly functional layer after drying. Specifically, with respect to drying conditions, it is preferable to carry out drying at 60 to 120° C. for 0.5 to 20 minutes, depending on the drying (volatilization) rate of the solvent.

Next, a process for producing the optically functional layer of the optical layered product according to the second inventions will be described. Low-refractive index microparticles having a low specific gravity and high-refractive index microparticles having a high specific gravity along with a resin and a solvent are mixed and made coatable. Here, the viscosity of the coating material is preferably from 1 to 200 Pa·s. Specific gravity of each component of the coating material is to be adjusted so that (1) the specific gravity of the low-refractive index translucent microparticles<the specific gravity of the high-refractive index translucent microparticles or (2) the specific gravity of the high-refractive index translucent microparticles<the specific gravity of the low-refractive index translucent microparticles. When the relationship (1) is satisfied, such a coating material is applied to a translucent substrate from above by die coating or the like and then dried at or below the dry point for the solvent for 5 to 30 seconds or more and at or above the dry point for the solvent for 30 seconds to 20 minutes, to provide an optically functional layer of the present invention. When the relationship (2) is satisfied, such a coating material is applied to a translucent substrate from below by die coating or the like and then dried at or below the dry point for the solvent for 5 to 30 seconds or more and at or above the dry point for the solvent for 30 seconds to 20 minutes, to provide an optically functional layer of the present invention. With a viscosity below 1 Pa·s, a good coated surface cannot be formed. Above 200 Pa·s, it is difficult to bias the low-refractive index translucent microparticles toward the surface layer side. The specific gravity of the solvent is desirably somewhere between the specific gravity of the low-refractive index translucent microparticles and the specific gravity of the high-refractive index translucent microparticles, but may be lower or higher. When the specific gravity of the solvent is somewhere between the specific gravity of the low-refractive index translucent microparticles and the specific gravity of the high-refractive index translucent microparticles, the low-refractive index microparticles will preferably be biased toward the surface layer side.

For other aspects of the process for producing the optical layered product according to the first, second and third inventions, procedures similar to those for conventional optical layered products are applicable. For example, processes for forming a resin layer over a translucent substrate are not particularly limited. For example, a translucent substrate is applied with a coating material containing a radiation-curable resin composition including translucent microparticles and the coating material is dried, followed by curing to produce a resin layer having microirregularities on the surface. As a procedure for applying a coating material to a translucent substrate, any ordinary coating or printing method is applicable. Specifically, coating, such as air doctor coating, bar coating, blade coating, knife coating, reverse coating, transfer roll coating, gravure roll coating, kiss roll coating, cast coating, spray coating, slot orifice coating, calendar coating, dam coating, dip coating and die coating as well as intaglio printing, such as gravure printing and stencil printing, such as screen printing may be used.

EXAMPLES

Examples and comparative examples of the present invention will be illustrated below. "Parts" are intended to mean "parts by weight."

First Invention

Example 1

A coating material for resin layer was obtained by dispersing a mixture consisting of components for coating material shown in Table 1 for one hour with a dispersion mixer and was applied by reverse coating method on one side of TAC as a transparent substrate having a film thickness of 80 μm and a total transmittance of 92%. After drying at 100° C. for one minute, ultraviolet irradiation was carried out in a nitrogen atmosphere using one 120 W/cm, beam-condensing, high-pressure mercury vapor lamp (irradiation distance 10 cm, irradiation time 30 seconds) to cure the coated film. Thus, an optically functional film of Example 1 having a resin layer 7 μm in thickness was obtained. FIG. 1 is an electron micrograph showing the manner of dispersion of translucent microparticles of the optically functional film produced by Example 1. In the figure, the square enclosure is a section of 50 μm in square. As observed through an electron microscope, none of the transparent microparticles were observed as outside the range of 1 to 20 μm (much the same is true to all examples below).

TABLE 1

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 200.7 |
| photopolymerization initiator | Ciba Specialty Chemicals Inc. | Irgacure-907 | | 10.6 |
| crosslinked polystyrene beads | Soken Chemical & Engineering Co., Ltd. | SX-350H, 3.5 μm in size | 1.59 | 10.0 |
| crosslinked methyl methacrylate beads | Sekisui Plastics Co., Ltd. | SSX-102, 2.5 μm in size | 1.49 | 10.0 |
| nitrocellulose | Asahi Kasei Corporation | HIG 120 | | 17.5 |
| leveling agent | BYK Japan KK | BYK-323 | | 1.3 |
| solvent | | MEK | | 250.0 |

Example 2

Except that the components of the coating material for resin layer were replaced by those in Table 2, the same procedure as in Example 1 was followed to obtain an optically functional film of Example 2 having a resin layer 7 μm in thickness.

Example 3

Except that the amount of nitrocellulose was increased to 35 parts by weight, the same procedure as in Example 1 was followed to obtain an optically functional film of Example 3 having a resin layer 7 μm in thickness.

Example 4

Except that the amount of nitrocellulose was reduced to 8.75 parts by weight, the same procedure as in Example 1 was followed to obtain an optically functional film of Example 4 having a resin layer 7 μm in thickness.

TABLE 2

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 133.8 |
| polyfunctional urethane acrylate | Kyoeisha Chemical Co., Ltd. | UA-3061 | 1.50 | 66.9 |
| photopolymerization initiator | Ciba Specialty Chemicals Inc. | Irgacure-907 | | 10.8 |
| crosslinked polystyrene beads | Soken Chemical & Engineering Co., Ltd. | SX-350H, 3.5 μm in size | 1.59 | 10.0 |
| crosslinked methyl methacrylate beads | Ganz Chemical Co., Ltd. | GMDM-050L, 5.0 μm in size | 1.49 | 10.0 |
| nitrocellulose | Asahi Kasei Corporation | HIG 120 | | 17.5 |
| leveling agent | BYK Japan KK | BYK-323 | | 1.3 |
| solvent | | MEK | | 250.0 |

Comparative Example 1

Except that the components of the coating material for resin layer were replaced by those in Table 3 and that drying was carried out at 60° C. for 30 seconds, the same procedure as in Example 1 was followed to obtain an optically functional film of Comparative Example 1 having a resin layer 7 μm in thickness. FIG. 2 is an electron micrograph showing the manner of dispersion of translucent microparticles of the optically functional film produced by Comparative Example 1. In the figure, the square enclosure is a section of 50 μm in square.

TABLE 3

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 100.3 |
| photopolymerization initiator | Ciba Specialty Chemicals Inc. | Irgacure-907 | | 5.3 |
| crosslinked polystyrene beads | Soken Chemical & Engineering Co., Ltd. | SX-350H, 3.5 μm in size | 1.59 | 5.0 |
| crosslinked methyl methacrylate beads | Sekisui Plastics Co., Ltd. | SSX-102, 2.5 μm in size | 1.49 | 5.0 |
| nitrocellulose | Asahi Kasei Corporation | HIG 120 | | 8.8 |
| leveling agent | BYK Japan KK | BYK-323 | | 0.6 |
| solvent | | MEK | | 375.0 |

Comparative Example 2

Except that the components of the coating material for resin layer were replaced by those in Table 4, the same procedure as in Example 1 was followed to obtain an optically functional film of Comparative Example 2 having a resin layer 7 μm in thickness.

TABLE 4

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 200.7 |
| photopolymerization initiator | Ciba Specialty Chemicals Inc. | Irgacure-907 | | 10.6 |
| silicone resin beads | GE Toshiba Silicone Co., Ltd. | Tosperl 130, 3.0 μm in size | 1.43 | 20.0 |
| nitrocellulose | Asahi Kasei Corporation | HIG 120 | | 17.5 |
| leveling agent | BYK Japan KK | BYK-323 | | 1.3 |
| solvent | | MEK | | 250 |

Comparative Example 3

Except that the components of the coating material for resin layer were replaced by those in Table 5, the same procedure as in Example 1 was followed to obtain an optically functional film of Comparative Example 3 having a resin layer 7 μm in thickness.

TABLE 5

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 217.4 |
| photopolymerization initiator | Ciba Specialty Chemicals Inc. | Irgacure-907 | | 11.4 |
| Silica beads | Fuji Silycia Chemical Ltd. | Sylicia 420, 3.1 μm in size | 1.46 | 20.0 |
| leveling agent | BYK Japan KK | BYK-323 | | 1.3 |
| solvent | | MEK | | 250.0 |

Comparative Example 4

Except that the components of the coating material for resin layer were replaced by those in Table 6, the same procedure as in Example 1 was followed to obtain an optically functional film of Comparative Example 4 having a resin layer 7 μm in thickness.

TABLE 6

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 217.4 |

TABLE 6-continued

| content | manufacturer | trade name | refractive index | parts by weight |
|---|---|---|---|---|
| photopolymerization initiator | Ciba Specialty Chemicals Inc. | Irgacure-907 | | 11.4 |
| crosslinked methyl methacrylate beads | Sekisui Plastics Co., Ltd. | SSX-102, 2.5 μm in size | 1.49 | 2.5 |
| nitrocellulose | Asahi Kasei Corporation | HIG 120 | | 17.5 |
| leveling agent | BYK Japan KK | BYK-323 | | 1.3 |
| solvent | | MEK | | 250.0 |

The optical layered products (optically functional films) obtained in Examples 1 to 4 and Comparative Examples 1 to 4 were used to measure and evaluate total transmittance, transmitted image definition (transmitted picture definition), antiglare properties, contrast and dazzling according to the procedure described below.

Total Transmittance

Measured according to JIS K7105, using a hazemeter (trade name: NDH 2000, Nippon Denshoku Industries Co., Ltd.).

Transmitted Image Definition

Measured according to JIS K7105, using an image clarity meter (trade name: ICM-1DP, Suga Test Instruments Co., Ltd.) set to the transmission mode with an optical comb width of 0.5 mm.

Haze Value

Measured according to JIS K7105, using a hazemeter (trade name: NDH 2000, Nippon Denshoku Industries Co., Ltd.).

An "internal haze value" refers to a value obtained by subtracting a haze value of a transparent sheet with pressure-sensitive adhesive from a haze value of an optical layered product having the transparent sheet over the microirregular surface of the optical layered product film.

The transparent sheet with pressure-sensitive adhesive used for measuring internal haze was as follows.

Transparent Sheet
  Component: polyethylene terephthalate (PET)
  Thickness: 38 μm
Pressure-Sensitive Adhesive Layer
  Component: acrylic pressure-sensitive adhesive
  Thickness: 10 μm
Haze of Transparent Sheet with Pressure-Sensitive Adhesive
  3.42

Antiglare Properties

Antiglare properties were rated as ⊚, ○ and × when the values of transparent image definition were from 0 to 30, from 31 to 70 and from 71 to 100, respectively.

Scratch Hardness

Measured according to JIS K-5600, using pencil method with a load of 750 g.

Contrast

A liquid crystal display (trade name: LC-37GX1W, Sharp Corporation) was layered via a crystal-clear, pressure-sensitive adhesive layer over the side opposite the side where the optical layered product according to each of Examples and Comparative Examples was formed. The liquid crystal display was irradiated with a fluorescent lamp (trade name: HH4125GL, Matsushita Electric Industrial Co., Ltd.) from 60° upward to the front of the liquid crystal display so that the illuminance at the liquid crystal display surface could be 200 lux. Thereafter, the values of brightness were measured when the liquid crystal display was white in color and black in color with a photometer/colorimeter (trade name: BM-5A, Topcon Corporation). The contrast was then calculated by using the values of brightness (cd/m$^2$) obtained when the display was black in color and white in color in the equation below and was rated as ×, ○ and ⊚ when the values were from 600 to 800, from 801 to 1,000 and from 1,001 to 1,200, respectively.

Contrast=brightness of display in white/brightness of display in black

Dazzle

A liquid crystal display with a resolution of 50 ppi (trade name: LC-32GD4, Sharp Corporation), a liquid crystal display with a resolution of 100 ppi (trade name: LL-T1620-B, Sharp Corporation), a liquid crystal display with a resolution of 120 ppi (trade name: LC-37GX1W, Sharp Corporation), a liquid crystal display with a resolution of 140 ppi (trade name: VGN-TX72B, Sony Corporation), a liquid crystal display with a resolution of 150 ppi (trade name: nw8240-PM780, Hewlett-Packard Japan, Ltd.) and a liquid crystal display with a resolution of 200 ppi (trade name: PC-CV50FW, Sharp Corporation) were layered via a crystal-clear, pressure-sensitive adhesive layer over the side opposite the side where the optical layered product according to each of Examples and Comparative Examples was formed. The liquid crystal displays were rendered green in color in a dark room and then images were photographed by a CCD camera with a resolution of 200 ppi (CV-200C, Keyence Corporation) from a direction normal to each liquid crystal display. Dazzle was rated as ×, ○ and ⊚ when the values of resolution were from 0 to 50 ppi, from 51 to 140 ppi and from 141 to 200 ppi, respectively when no variability in brightness was observed.

The results of evaluations according to the procedure described above are shown in Table 7.

Second Invention

Example 5

A coating material for resin layer was obtained by dispersing a mixture consisting of components for coating material listed below for one hour with a dispersion mixer and was applied from below by die coating method on one side of TAC as a transparent substrate having a film thickness of 80 μm and a total transmittance of 92% and left standstill for 20 seconds. After drying at 100° C. for one minute, ultraviolet irradiation was carried out in a nitrogen atmosphere using one 120 W/cm, beam-condensing, high-pressure mercury vapor lamp (irradiation distance 10 cm, irradiation time 30 seconds) to cure the coated film. Thus, an optically functional film of Example 5 having a resin layer 7 μm in thickness was obtained. As observed through an electron microscope, none of the transparent microparticles were observed as outside the range of 1 to 20 μm (much the same is true to all examples below).

TABLE 8

| content | manufacturer | trade name | refractive index | parts by weight |
|---|---|---|---|---|
| polyfunctional acrylate | Shin-Nakamura Chemical Co., Ltd. | NK ester A-DPH | 1.49 | 205.0 |
| photopolymerization initiator | Ciba Specialty Chemicals Inc. | Irgacure-907 | | 6.3 |
| crosslinked polystyrene beads | Soken Chemical & Engineering Co., Ltd. | SX-350H, 3.5 μm in size | 1.59 | 10.0 |
| crosslinked methyl methacrylate beads | Sekisui Plastics Co., Ltd. | SSX-102, 2.5 μm in size | 1.49 | 10.0 |

TABLE 7

| | CV Pa·s | DC | ADV | TH | IH | TT | TID | Ra | Sm | AG | con. | daz. |
|---|---|---|---|---|---|---|---|---|---|---|---|---|
| E1 | 83 | 100° C., 1 min | 0.09 | 27.5 | 23.5 | 93.6 | 57.8 | 0.098 | 158 | ○ | ○ | ○ |
| E2 | 79 | 100° C., 1 min | 0.10 | 27.8 | 23.3 | 93.4 | 56.2 | 0.102 | 162 | ○ | ○ | ○ |
| E3 | 200 | 120° C., 1 min | 0.06 | 26.5 | 24.0 | 93.5 | 60.5 | 0.150 | 120 | ○ | ○ | ○ |
| E4 | 20 | 120° C., 1 min | 0.19 | 28.5 | 23.5 | 93.5 | 28.5 | 0.205 | 115 | ⊚ | ○ | ○ |
| CE1 | 4 | 60° C., 30 sec | 0.31 | 30.5 | 22.1 | 93.2 | 8.5 | 0.282 | 102 | ⊚ | × | × |
| CE2 | 75 | 100° C., 1 min | 0.03 | 48.5 | 36.5 | 93.9 | 22.5 | 0.165 | 75 | ○ | × | ⊚ |
| CE3 | 1 | 100° C., 1 min | 0.35 | 30.5 | 4.2 | 91.8 | 1.8 | 0.352 | 85 | ⊚ | × | × |
| CE4 | 1 | 100° C., 1 min | 1.12 | 1.5 | 0.2 | 93.8 | 91.5 | 0.010 | 380 | × | ⊚ | ⊚ |

E = Example
CE = Comparative Example
CV = coating viscosity
DC = drying conditions
ADV = area dispersion variability
TH = total haze
IH = internal haze value
TT = total transmittance
TID = transmitted image definition TABLE 8-continued

| content | manufacturer | trade name | parts by weight |
|---|---|---|---|
| nitrocellulose | Asahi Kasei Corporation | HIG 120 | 17.5 |
| leveling agent | Kyoeisha Chemical Co., Ltd. | POLYFLOW No. 77 | 1.3 |
| solvent | Sumitomo 3M Limited | Novec HFE 7200 | 125.0 |
| solvent | | MEK | 125.0 |

Specific gravity
Crosslinked polystyrene beads: 1.06
Crosslinked methyl methacrylate beads: 1.20
Coating material including resin matrix: 1.15

Comparative Example 5

Except that the components of the coating material for resin layer were replaced by those listed below, the same procedure as in Example 5 was followed to obtain an optically functional film of Comparative Example 5 having a resin layer 7 μm in thickness.

TABLE 9

| content | manufacturer | trade name | refractive index | parts by weight |
|---|---|---|---|---|
| polyfunctional acrylate | Shin-Nakamura Chemical Co., Ltd. | NK ester A-DPH | 1.49 | 205.0 |
| photopolymerization initiator | Ciba Specialty Chemicals Inc. | Irgacure-907 | | 6.3 |
| silicone resin beads | GE Toshiba Silicone Co., Ltd. | Tosperl 130, 3.0 μm in size | 1.43 | 10.0 |
| crosslinked methyl methacrylate beads | Sekisui Plastics Co., Ltd. | SSX-102, 2.5 μm in size | 1.49 | 10.0 |
| nitrocellulose | Asahi Kasei Corporation | HIG 120 | | 17.5 |
| leveling agent | Kyoeisha Chemical Co., Ltd. | POLYFLOW No. 77 | | 1.3 |
| solvent | | MEK | | 250.0 |

Specific gravity
Silicone resin beads: 1.32
Crosslinked methyl methacrylate beads: 1.20
Coating material including resin matrix: 0.98

Comparative Example 6

Except that the components of the coating material for resin layer were replaced by those listed below and that the application was carried out from above by die coating method, the same procedure as in Example 5 was followed to obtain an optically functional film of Comparative Example 6 having a resin layer 7 μm in thickness.

TABLE 10

| content | manufacturer | trade name | refractive index | parts by weight |
|---|---|---|---|---|
| polyfunctional acrylate | Shin-Nakamura Chemical Co., Ltd. | NK ester A-DPH | 1.49 | 205.0 |
| photopolymerization initiator | Ciba Specialty Chemicals Inc. | Irgacure-907 | | 6.3 |
| Silica beads | Fuji Silycia Chemical Ltd. | Sylicia 420, 3.1 μm in size | 1.46 | 10.0 |
| crosslinked polystyrene beads | Soken Chemical & Engineering Co., Ltd. | SX-350H, 3.5 μm in size | 1.59 | 10.0 |
| nitrocellulose | Asahi Kasei Corporation | HIG 120 | | 17.5 |
| leveling agent | Kyoeisha Chemical Co., Ltd. | POLYFLOW No. 77 | | 1.3 |
| solvent | Sumitomo 3M Limited | Novec HFE 7200 | | 125.0 |
| solvent | | MEK | | 125.0 |

Specific gravity
Silica beads: 2.15
Crosslinked polystyrene beads: 1.06
Coating material including resin matrix: 1.15

Comparative Example 7

Except that the components of the coating material for resin layer were replaced by those listed below and that the application was carried out from above by die coating method, the same procedure as in Example 5 was followed to obtain an optically functional film of Comparative Example 7 having a resin layer 7 μm in thickness.

TABLE 11

| content | manufacturer | trade name | refractive index | parts by weight |
|---|---|---|---|---|
| polyfunctional acrylate | Shin-Nakamura Chemical Co., Ltd. | NK ester A-DPH | 1.49 | 236.5 |
| photopolymerization initiator | Ciba Specialty Chemicals Inc. | Irgacure-907 | | 7.3 |
| Silica beads | Fuji Silycia Chemical Ltd. | Sylicia 420, 3.1 μm in size | 1.46 | 2.5 |
| crosslinked polystyrene beads | Soken Chemical & Engineering Co., Ltd. | SX-350H, 3.5 μm in size | 1.59 | 2.5 |
| nitrocellulose | Asahi Kasei Corporation | HIG 120 | | 17.5 |
| leveling agent | Kyoeisha Chemical Co., Ltd. | POLYFLOW No. 77 | | 1.3 |
| solvent | Sumitomo 3M Limited | Novec HFE 7200 | | 125.0 |
| solvent | | MEK | | 125.0 |

Specific gravity
Silica beads: 2.15
Crosslinked polystyrene beads: 1.06
Coating material including resin matrix: 1.15

The optical layered products obtained in Example 5 and Comparative Examples 5 to 7 were used to measure and evaluate total haze, internal haze, total transmittance, transmitted image definition (transmitted picture definition), anti-glare properties, contrast and dazzling according to the procedure described below. The results are shown in Table 12.

TABLE 12

| | CV | DC | TH | IH | TT | TID | Ra | Sm | AG | con. | daz. |
|---|---|---|---|---|---|---|---|---|---|---|---|
| E3 | 82 | from below | 27.7 | 23.4 | 93.8 | 58.2 | 0.095 | 162 | ○ | ○ | ○ |
| CE5 | 65 | from below | 28.7 | 23.5 | 93.4 | 52.6 | 0.113 | 131 | ○ | x | ○ |
| CE6 | 70 | from above | 40.5 | 10.8 | 92.3 | 3.8 | 0.308 | 90 | ◎ | x | x |
| CE7 | 3 | from above | 4.5 | 1.2 | 93.5 | 83.7 | 0.023 | 365 | x | ○ | ◎ |

DC = direction of coating

Third Invention

Example 6

A coating material for resin layer was obtained by dispersing a mixture consisting of components for coating material as shown in Table 13 for one hour with a dispersion mixer and was applied by reverse coating method on one side of TAC as a transparent substrate having a film thickness of 80 μm and a total transmittance of 92%. After drying at 100° C. for one minute, ultraviolet irradiation was carried out in a nitrogen atmosphere using one 120 W/cm, beam-condensing, high-pressure mercury vapor lamp (irradiation distance 10 cm, irradiation time 30 seconds) to cure the coated film. Thus, an optically functional film of Example 6 having a resin layer 9 μm in thickness was obtained. As observed through an electron microscope, none of the transparent microparticles were observed as outside the range of 1 to 9 μm (much the same is true to all examples below except Comparative Examples 10 and 13).

TABLE 13

| content | manufacturer | trade name | refractive index | parts by weight |
|---|---|---|---|---|
| polyfunctional urethane acrylate | Kyoeisha Chemical Co., Ltd. | AH-600 | 1.50 | 209.8 |
| photopolymerization initiator | Ciba Specialty Chemicals Inc. | Irgacure-907 | | 6.5 |
| crosslinked polystyrene beads | Ganz Chemical Co., Ltd. | GMDM-050H, 5.0 μm in size | 1.59 | 15.0 |
| crosslinked methyl methacrylate beads | Ganz Chemical Co., Ltd. | GMDM-050L, 5.0 μm in size | 1.49 | 10.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Example 7

Except that the components of the coating material for resin layer were replaced by those in Table 14 and that the resin layer had a thickness of 7 μm, the same procedure as in Example 6 was followed to obtain an optically functional film of Example 7.

TABLE 14

| content | manufacturer | trade name | refractive index | parts by weight |
|---|---|---|---|---|
| polyfunctional urethane acrylate | Kyoeisha Chemical Co., Ltd. | AH-600 | 1.50 | 219.5 |
| photopolymerization initiator | Ciba Specialty Chemicals Inc. | Irgacure-907 | | 6.8 |
| crosslinked polystyrene beads | Soken Chemical & Engineering Co., Ltd. | SX-350H, 3.5 μm in size | 1.59 | 7.5 |
| crosslinked methyl methacrylate beads | Ganz Chemical Co., Ltd. | GMDM-050L, 5.0 μm in size | 1.49 | 2.5 |
| crosslinked methyl methacrylate beads | Soken Chemical & Engineering Co., Ltd. | MX-300, 3.0 μm in size | 1.49 | 5.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Comparative Example 8

Except that the components of the coating material for resin layer were replaced by those in Table 15 and that the resin layer had a thickness of 4 μm, the same procedure as in Example 6 was followed to obtain an optically functional film of Comparative Example 8.

TABLE 15

| content | manufacturer | trade name | refractive index | parts by weight |
|---|---|---|---|---|
| polyfunctional acrylate | Kyoeisha Chemical Co., Ltd. | Light-Acrylate DPE-6A | 1.49 | 205.0 |
| photopolymerization initiator | Ciba Specialty Chemicals Inc. | Irgacure-907 | | 6.3 |
| crosslinked polystyrene beads | Soken Chemical & Engineering Co., Ltd. | SX-350H, 3.5 μm in size | 1.59 | 30.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Comparative Example 9

Except that the components of the coating material for resin layer were replaced by those in Table 16, the same procedure as in Example 6 was followed to obtain an optically functional film of Comparative Example 9 having a thickness of 9 μm.

TABLE 16

| content | manufacturer | trade name | refractive index | parts by weight |
|---|---|---|---|---|
| polyfunctional acrylate | Shin-Nakamura Chemical Co., Ltd. | U-6HA | 1.49 | 200.1 |
| photopolymerization initiator | Ciba Specialty Chemicals Inc. | Irgacure-907 | | 6.2 |
| crosslinked polystyrene beads | Soken Chemical & Engineering Co., Ltd. | SX-130H, 1.3 μm in size | 1.59 | 20.0 |
| crosslinked methyl methacrylate beads | Sekisui Plastics Co., Ltd. | SSX-102, 2.5 μm in size | 1.49 | 15.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Comparative Example 10

Except that the components of the coating material for resin layer were replaced by those in Table 17 and that the resin layer had a thickness of 7 μm, the same procedure as in Example 6 was followed to obtain an optically functional film of Comparative Example 10.

TABLE 17

| content | manufacturer | trade name | refractive index | parts by weight |
|---|---|---|---|---|
| polyfunctional urethane acrylate | Shin-Nakamura Chemical Co., Ltd. | U-6HA | 1.49 | 231.6 |
| photopolymerization initiator | Ciba Specialty Chemicals Inc. | Irgacure-907 | | 7.2 |
| crosslinked polystyrene beads | Ganz Chemical Co., Ltd. | GMDS-100M, 10.0 μm in size | 1.59 | 5.0 |
| crosslinked methyl methacrylate beads | Ganz Chemical Co., Ltd. | GMDM-100M, 10.0 μm in size | 1.49 | 5.0 |
| leveling agent | Kyoeisha Chemical Co., Ltd. | POLYFLOW No. 77 | | 1.3 |
| solvent | | MIBK | | 200 |
| solvent | | cyclohexanone | | 50 |

Example 8

Except that the components of the coating material for resin layer were replaced by those in Table 16 and that the resin layer had a thickness of 5 μm, the same procedure as in Example 6 was followed to obtain an optically functional film of Example 8.

Example 9

Except that the resin layer had a thickness of 6 μm, the same procedure as in Example 6 was followed to obtain an optically functional film of Example 9.

Example 10

Except that the components of the coating material for resin layer were replaced by those in Table 18 and that the resin layer had a thickness of 12 μm, the same procedure as in Example 6 was followed to obtain an optically functional film of Example 10.

TABLE 18

| content | manufacturer | trade name | refractive index | parts by weight |
|---|---|---|---|---|
| polyfunctional urethane acrylate | Kyoeisha Chemical Co., Ltd. | AH-600 | 1.50 | 209.8 |
| photopolymerization initiator | Ciba Specialty Chemicals Inc. | Irgacure-907 | | 6.5 |
| crosslinked polystyrene beads | Sekisui Plastics Co., Ltd. | SBX-8, 8.0 μm in size | 1.59 | 15.0 |
| crosslinked methyl methacrylate beads | Ganz Chemical Co., Ltd. | GMDM-050L, 5.0 μm in size | 1.49 | 10.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Example 11

Except that the components of the coating material for resin layer were replaced by those in Table 19 and that the resin layer had a thickness of 15 μm, the same procedure as in Example 6 was followed to obtain an optically functional film of Example 11.

TABLE 19

| content | manufacturer | trade name | refractive index | parts by weight |
|---|---|---|---|---|
| polyfunctional urethane acrylate | Kyoeisha Chemical Co., Ltd. | AH-600 | 1.50 | 209.8 |
| photopolymerization initiator | Ciba Specialty Chemicals Inc. | Irgacure-907 | | 6.5 |
| crosslinked polystyrene beads | Sekisui Plastics Co., Ltd. | SBX-6, 6.0 μm in size | 1.59 | 8.5 |
| crosslinked methyl methacrylate beads | Sekisui Plastics Co., Ltd. | MBX-8, 8.0 μm in size | 1.49 | 10.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Comparative Example 11

Except that the components of the coating material for resin layer were replaced by those in Table 16 and that the resin layer had a thickness of 4 μm, the same procedure as in Example 6 was followed to obtain an optically functional film of Comparative Example 11.

Comparative Example 12

Except that the components of the coating material for resin layer were replaced by those in Table 20 and that the resin layer had a thickness of 10 μm, the same procedure as in Example 6 was followed to obtain an optically functional film of Comparative Example 12.

TABLE 20

| content | manufacturer | trade name | refractive index | parts by weight |
|---|---|---|---|---|
| polyfunctional urethane acrylate | Kyoeisha Chemical Co., Ltd. | Light-Acrylate DPE-6A | 1.49 | 205.0 |
| photopolymerization initiator | Ciba Specialty Chemicals Inc. | Irgacure-907 | | 6.3 |
| crosslinked polystyrene beads | Sekisui Plastics Co., Ltd. | SBX-8, 8.0 μm in size | 1.59 | 30.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

Comparative Example 13

Except that the components of the coating material for resin layer were replaced by those in Table 17 and that the resin layer had a thickness of 15 μm, the same procedure as in Example 6 was followed to obtain an optically functional film of Comparative Example 13.

Comparative Example 14

Except that the resin layer had a thickness of 16 μm, the same procedure as in Example 6 was followed to obtain an optically functional film of Comparative Example 14.

Comparative Example 15

Except that the components of the coating material for resin layer were replaced by those in Table 21 and that the resin layer had a thickness of 5 μm, the same procedure as in Example 6 was followed to obtain an optically functional film of Comparative Example 15.

TABLE 21

| content | manufacturer | trade name | refractive index | parts by weight |
|---|---|---|---|---|
| polyfunctional urethane acrylate | Kyoeisha Chemical Co., Ltd. | Light-Acrylate DPE-6A | 1.49 | 205.0 |
| photopolymerization initiator | Ciba Specialty Chemicals Inc. | Irgacure-907 | | 6.3 |
| crosslinked polystyrene beads | Sekisui Plastics Co., Ltd. | SBX-6, 6.0 μm in size | 1.59 | 30.0 |
| nitrocellulose | Asahi Kasei Corporation | HIG 120 | | 7.5 |
| leveling agent | Kyoeisha Chemical Co., Ltd. | POLYFLOW No. 77 | | 1.3 |
| solvent | | MIBK | | 200 |
| solvent | | cyclohexanone | | 50 |

The optical layered products (optically functional films) obtained in Examples 6 to 11 and Comparative Examples 8 to 15 were used to measure and evaluate total transmittance, transmitted image definition (transmitted picture definition), antiglare properties, contrast and dazzling according to the procedure described above. All the beads used in all the examples were observed and confirmed through electron microscopy to be in the range defined in the inequality for X and Y described above. The observed values of particle sizes of the translucent microparticles in Examples and Comparative Examples are shown in Table 22. Also, the results of evaluation according to the procedure described above are shown in Table 23. For Sm for Comparative Example 14 in Table 23, it was designated as "-" since the surface of the film was lustrous.

TABLE 22

| | Observed values for 95% or more of translucent microparticles through electron microscopy (μm) |
|---|---|
| Example 6 | 4.8 to 5.2 |
| Example 7 | 2.8 to 5.2 |
| Example 8 | 1.1 to 2.7 |
| Example 9 | 4.8 to 5.2 |
| Example 10 | 4.8 to 8.2 |
| Example 11 | 5.8 to 8.2 |
| Comparative Example 8 | 3.3 to 3.7 |
| Comparative Example 9 | 1.1 to 2.7 |
| Comparative Example 10 | 9.8 to 10.2 |
| Comparative Example 11 | 1.1 to 2.7 |
| Comparative Example 12 | 7.8 to 8.2 |
| Comparative Example 13 | 9.8 to 10.2 |
| Comparative Example 14 | 4.8 to 5.2 |
| Comparative Example 15 | 5.8 to 6.2 |

TABLE 23

|  | FT | TH | IH | TT | TID | Ra | Sm | AG | con. | daz. | SH |
|---|---|---|---|---|---|---|---|---|---|---|---|
| E6 | 9 | 24.7 | 20.3 | 93.0 | 61.0 | 0.088 | 170 | ○ | ○ | ○ | 4H |
| E7 | 7 | 23.5 | 18.8 | 93.3 | 57.2 | 0.103 | 153 | ○ | ○ | ○ | 4H |
| E8 | 5 | 48.5 | 35.0 | 92.0 | 22.5 | 0.186 | 135 | ◎ | ○ | ◎ | 3H |
| E9 | 6 | 47.5 | 19.5 | 93.1 | 10.5 | 0.182 | 150 | ◎ | ○ | ○ | 3H |
| E10 | 12 | 43.6 | 28.6 | 93.1 | 12.5 | 0.135 | 180 | ◎ | ○ | ○ | 4H |
| E11 | 15 | 40.5 | 35.0 | 93.6 | 55.8 | 0.111 | 165 | ◎ | ○ | ○ | 5H |
| CE8 | 4 | 41.3 | 29.7 | 93.6 | 23.8 | 0.162 | 101 | ○ | x | ○ | 2H |
| CE9 | 9 | 37.2 | 35.3 | 93.9 | 88.2 | 0.031 | 121 | x | ○ | ○ | 4H |
| CE10 | 7 | 41.2 | 12.3 | 91.3 | 2.9 | 0.351 | 71 | ◎ | x | x | 4H |
| CE11 | 4 | 52.6 | 30.5 | 93.0 | 3.5 | 0.235 | 100 | ◎ | x | x | 2H |
| CE12 | 10 | 55.6 | 40.5 | 90.8 | 5.6 | 0.351 | 93 | ◎ | x | x | 4H |
| CE13 | 15 | 30.5 | 28.5 | 92.8 | 75.0 | 0.041 | 185 | x | ○ | ○ | 5H |
| CE14 | 16 | 40.0 | 39.8 | 92.2 | 92.0 | 0.022 | — | x | ○ | ○ | 5H |
| CE15 | 5 | 56.5 | 42.3 | 91.2 | 2.3 | 0.381 | 128 | ◎ | x | x | 3H |

FT = film thickness
SH = scratch hardness

The optical layered products according to the first inventions can provide optical layered products which satisfy anti-glare properties, contrast, color reproducibility and dazzling in a balanced manner by controlling the area dispersion variability of the translucent microparticles in the optically functional layer.

The optical layered products according to the second inventions can provide images having enhanced contrast and suppressed dazzling when the optical layered products are mounted on a display such as an LCD because the low-refractive index translucent microparticles are more abundantly distributed toward the surface side to optimize light scattering inside and on the surface of the optically functional layer.

The optical layered products according to the third inventions can provide optical layered products which satisfy anti-glare properties, contrast and dazzling in a balanced manner by controlling the film thickness of the optically functional layer and the particle size of the translucent microparticles within appropriate ranges.

What is claimed is:

1. An optical layered product comprising a translucent substrate and at least an optically functional layer containing first translucent microparticles and second translucent microparticles, the optically functional layer being provided directly or via another layer onto one or both sides of the translucent substrate, wherein the first translucent microparticles have a lower refractive index than the second translucent microparticles;
   95% or more, in number, of the first and second microparticles have an actual particle size in the range of 1 to 20 µm as observed by electron microscopy;
   the optical layered product having irregularities on an outermost surface of the optical functional layer;
   the first translucent microparticles being more abundantly contained in the optically functional layer closer to a surface thereof than to the translucent substrate; and
   the specific gravity of the first translucent microparticles being small than the specific gravity of the second translucent microparticles.

2. The optical layered product according to claim 1, wherein the optically functional layer contains at least a radiation-curable resin, one or more kinds of the first translucent microparticles and one or more kinds of the second translucent microparticles.

3. The optical layered product according to claim 2, wherein a difference in refractive index between the radiation-curable resin and the first translucent microparticles is in a range of ±0.05 or less and a difference in refractive index between the radiation-curable resin and the second translucent microparticles is in a range of 0.05 or more.

4. The optical layered product according to claim 3 wherein the density distribution of the first translucent microparticles is 60% or more, wherein the density distribution is obtained by randomly extracting 20 sections from an electron photomicrograph of a cross section of the optically functional layer in such a manner that the width direction of the optically functional layer is 30 µm,
   counting number of center points of the first translucent microparticles located closer to surface side than to centerline of the optically functional layer,
   counting total number of center points of the first translucent microparticles in the optically functional layer, and
   calculating the density distribution (%) by the equation:

Density distribution (%)=(number of center points of the first translucent microparticles located closer to surface side than to centerline of the optically functional layer/total number of center points of the first translucent microparticles in the optically functional layer)×100.

5. The optical layered product according to claim 2 wherein the density distribution of the first translucent microparticles is 60% or more, wherein the density distribution is obtained by randomly extracting 20 sections from an electron photomicrograph of a cross section of the optically functional layer in such a manner that the width direction of the optically functional layer is 30 µm,
   counting number of center points of the first translucent microparticles located closer to surface side than to centerline of the optically functional layer,
   counting total number of center points of the first translucent microparticles in the optically functional layer, and
   calculating the density distribution (%) by the equation:

Density distribution (%)=(number of center points of the first translucent microparticles located closer to surface side than to centerline of the optically functional layer/total number of center points of the first translucent microparticles in the optically functional layer)×100.

6. The optical layered product according to claim 1, wherein the first translucent microparticles and the second microparticles are spherical resin microparticles.

7. The optical layered product according to claim 6 wherein the density distribution of the first translucent microparticles is 60% or more, wherein the density distribution is obtained by randomly extracting 20 sections from an electron photomicrograph of a cross section of the optically functional layer in such a manner that the width direction of the optically functional layer is 30 μm, counting number of center points of the first translucent microparticles located closer to surface side than to centerline of the optically functional layer, counting total number of center points of the first translucent microparticles in the optically functional layer, and calculating the density distribution (%) by the equation:

Density distribution (%)=(number of center points of the first translucent microparticles located closer to surface side than to centerline of the optically functional layer/total number of center points of the first translucent microparticles in the optically functional layer)×100.

8. The optical layered product according to claim 1 wherein the density distribution of the first translucent microparticles is 60% or more, wherein the density distribution is obtained by randomly extracting 20 sections from an electron photomicrograph of a cross section of the optically functional layer in such a manner that the width direction of the optically functional layer is 30 μm, counting number of center points of the first translucent microparticles located closer to surface side than to centerline of the optically functional layer, counting total number of center points of the first translucent microparticles in the optically functional layer, and calculating the density distribution (%) by the equation:

Density distribution (%)=(number of center points of the first translucent microparticles located closer to surface side than to centerline of the optically functional layer/total number of center points of the first translucent microparticles in the optically functional layer)×100.

* * * * *